(12) United States Patent
Hata et al.

(10) Patent No.: US 7,016,681 B2
(45) Date of Patent: Mar. 21, 2006

(54) MOBILE COMMUNICATION DEVICE AND DATA COMMUNICATION METHOD USING THE SAME

(75) Inventors: Koichi Hata, Katano (JP); Munehito Matsuda, Neyagawa (JP); Kiyoshi Ogishi, Kyoto (JP); Hiromi Wada, Neyagawa (JP); Atsunobu Kato, Ebina (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 603 days.

(21) Appl. No.: 10/040,786

(22) Filed: Jan. 9, 2002

(65) Prior Publication Data

US 2002/0098845 A1    Jul. 25, 2002

(30) Foreign Application Priority Data

Jan. 19, 2001    (JP)    ............................. 2001-011250

(51) Int. Cl.
*H04Q 7/20*    (2006.01)
*G06F 3/00*    (2006.01)
*G06F 17/60*    (2006.01)

(52) U.S. Cl. ..................... 455/445; 455/556.1; 710/10; 710/1; 705/14

(58) Field of Classification Search ............... 455/3.04, 455/74.1, 78, 41.2, 462, 465, 432.3, 424, 455/425, 426.1, 550.1, 406, 411, 405, 435.2, 455/412.1, 412.2, 556.1, 431; 709/246, 227; 710/10, 1; 705/14; 345/156; 358/1.15
See application file for complete search history.

(56) References Cited

U.S. PATENT DOCUMENTS 5,353,328 A * 10/1994 Jokimies ..................... 455/558
5,872,926 A * 2/1999 Levac et al. ................. 709/206
5,877,745 A * 3/1999 Beeteson et al. ........... 345/156
6,011,976 A * 1/2000 Michaels et al. ........... 455/466
6,473,609 B1 * 10/2002 Schwartz et al. ........... 455/406
6,526,335 B1 * 2/2003 Treyz et al. .................... 701/1
6,549,773 B1 * 4/2003 Linden et al. ........... 455/426.1
6,574,678 B1 * 6/2003 Nykanen et al. .............. 710/10

(Continued)

FOREIGN PATENT DOCUMENTS

EP    1 052 863    11/2000

(Continued)

OTHER PUBLICATIONS

Marran N L: "Over-the-Air Subscriber Device Management Using CDMA Data and Wap", Proceedings of Annual Virginia Tech Symposium on Wireless Personal Communications, Jun. 2, 1999, pp. 161-170, XP001058327.

*Primary Examiner*—William Trost
*Assistant Examiner*—Kiet Doan
(74) *Attorney, Agent, or Firm*—Wenderoth, Lind & Ponack, L.L.P.

(57) ABSTRACT

A mobile communication device that flexibly supports various services which utilize both Internet communications and short-distance wireless communications. An instruction data receiving section receives instruction data indicating a protocol in which a set of data exchanges are to be performed. An instruction data analysis section analyzes the received instruction data, and controls a reception switching section and a transmission switching section based on a result of the analysis. The reception switching section receives data from either an Internet reception section or a short-distance wireless reception section under the control of the instruction data analysis section. The transmission switching section outputs data to either an Internet transmission section or a short-distance wireless transmission section under the control of the instruction data analysis section.

15 Claims, 10 Drawing Sheets

U.S. PATENT DOCUMENTS

| | | |
|---|---|---|
| 6,587,450 B1 * | 7/2003 | Pasanen ................... 370/338 |
| 6,587,835 B1 * | 7/2003 | Treyz et al. ................ 705/14 |
| 6,760,778 B1 * | 7/2004 | Nelson et al. ............. 709/246 |
| 6,885,877 B1 * | 4/2005 | Ozaki et al. ............ 455/556.1 |
| 2001/0014868 A1 * | 8/2001 | Herz et al. ................... 705/14 |
| 2001/0034207 A1 * | 10/2001 | Matsui ........................ 455/41 |
| 2001/0049286 A1 * | 12/2001 | Hansmann et al. ......... 455/435 |
| 2002/0019223 A1 * | 2/2002 | Lee et al. .................. 455/411 |
| 2002/0038372 A1 * | 3/2002 | Idehara et al. ............. 709/227 |
| 2002/0094812 A1 * | 7/2002 | Lee ........................... 455/435 |
| 2002/0168959 A1 * | 11/2002 | Noguchi et al. ............ 455/405 |
| 2002/0183042 A1 * | 12/2002 | Thornton ................... 455/412 |
| 2003/0038963 A1 * | 2/2003 | Yamaguchi ................ 358/1.15 |
| 2003/0114105 A1 * | 6/2003 | Haller et al. ................. 455/41 |

FOREIGN PATENT DOCUMENTS

| | | |
|---|---|---|
| EP | 1 071 255 | 1/2001 |
| JP | 11-088965 | 3/1999 |
| JP | 2000-148637 | 5/2000 |
| JP | 2001-189808 | 7/2001 |
| WO | 99/29126 | 6/1999 |
| WO | 00/65851 | 11/2000 |

\* cited by examiner

```
<?XML version="1.0"?>
<!DOCTYPE Plugin_Metafile_1 SYSTEM "pluginxml.dtd">
```

```
<pluginMetadata>

<sessionID>"1234"</sessionID>

<writeData>"Give me Shop No."</writeData>

<writeDataToURL>
        "POST, http://server/tenpo.cgi?shopno"
    </writeDataToURL>

<readDataFromURL>
        "GET, http://server/tenpo.cgi?waribiki"
    </readDataFromURL>

<readData>"End."</readData>

</pluginMetadata>
```

MOBILE COMMUNICATION DEVICE AND DATA COMMUNICATION METHOD USING THE SAME

BACKGROUND OF THE INVENTION

1. Field of the Invention

The present invention relates to a mobile communication device, and more particularly, to a mobile communication device to be coupled to both an external device having a short-distance wireless communication function and a server on a network in a manner so as to enable communications for exchanging data with the external device and the server in accordance with a predetermined protocol.

2. Description of the Background Art

In recent years, mobile terminals having Internet connection capabilities have been gaining prevalence rapidly. Such mobile terminals permit users to have access to the Internet free from time or space limitations. Various contents and services which are provided on the Internet are available to the users of such mobile terminals.

Some mobile terminals are provided with not only an Internet communication function but also an infrared communication function for enabling the exchange of data with an external device which is located in the neighborhood of the mobile terminals. A user may utilize the infrared communication function to transfer telephone directory information, address book information, and/or schedule information, etc., from a mobile terminal to a personal computer, or vice versa.

An example of a service which is currently available through the use of such mobile terminals may be a discount service which a user can utilize at a brick-and-mortar store. Under such a discount service, for example, a user who has registered his or her personal information with a service-providing entity by using a mobile terminal becomes entitled to discount coupons. The user is allowed to use the discount coupons when making a purchase at a store which is associated with the service-providing entity. Then, the service-providing entity may take a consolidated look at the information concerning the usage of discount coupons and the results of questionnaires (which may be filled out, for example, at the time when a user registers his or her personal information), which could facilitate its market surveys. Hereinafter, such a conventional discount service system will be further described.

Figure 7:
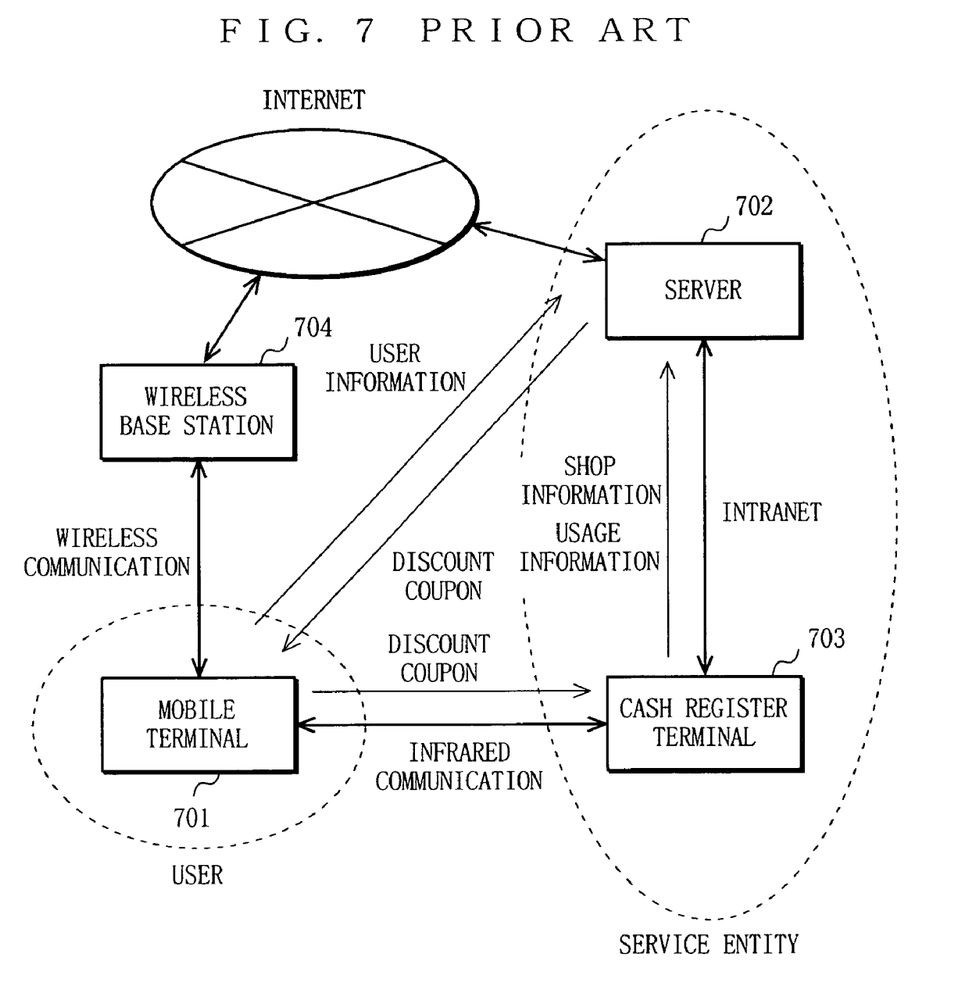
FIG. 7 is a block diagram illustrating the overall configuration of a conventional discount service system.

FIG. 7 shows the overall structure of an exemplary discount service system. This discount service system comprises a mobile terminal 701 to be used by a user on-the-go, a server 702 which is managed by a service-providing entity, and a cash register terminal 703. The mobile terminal 701 and the server 702 are coupled to each other in a manner so as to enable communication therebetween via wireless Internet access. The mobile terminal 701 and the cash register terminal 703 are coupled to each other in a manner so as to enable communication therebetween via infrared communication. The cash register terminal 703 and the server 702 are coupled to each other via an intranet which is installed within the service-providing entity.

Figure 8:
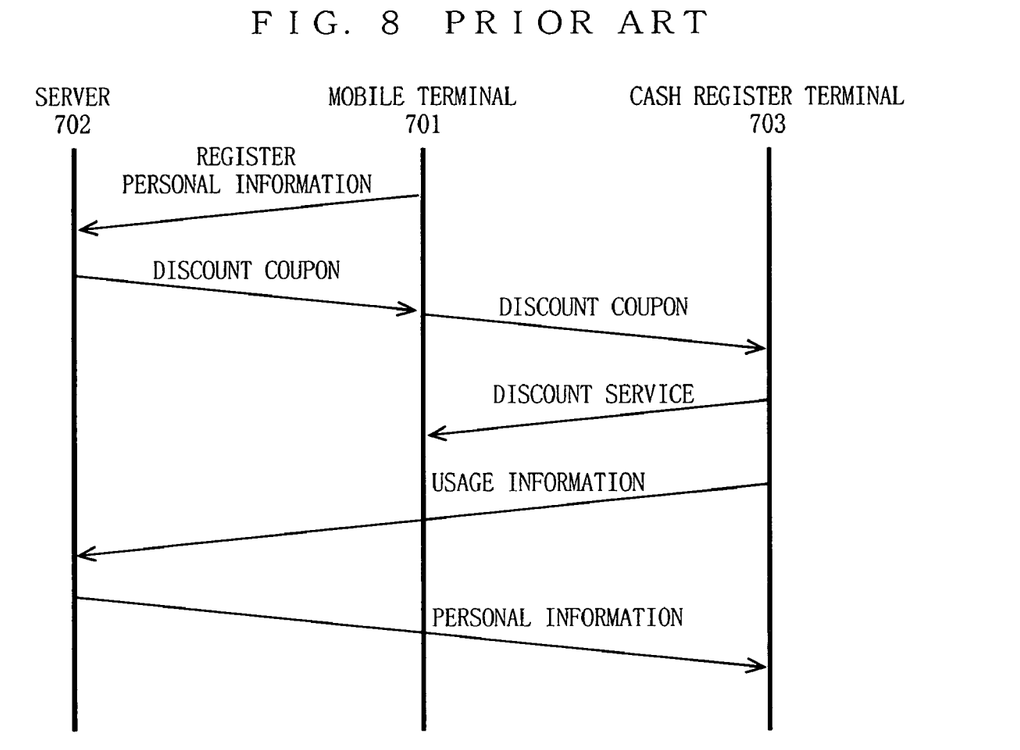
FIG. 8 is a sequence diagram illustrating the operation of a conventional discount service system.

FIG. 8 illustrates a sequence of operations to be performed under an exemplary discount service system. First, a user uses the mobile terminal 701 to register his or her personal information with the server 702 via a wireless base station 704 and the Internet. After the registration of the personal information is completed, the server 702 transmits discount coupons to the mobile terminal 701. Then, when making a purchase, the user may transmit a discount coupon from the mobile terminal 701 to the cash register terminal 703 via infrared communication in order to enjoy a discount in accordance with the discount coupon transmitted. Thereafter, usage information concerning the use of the discount coupons is transmitted from the cash register terminal 703 to the server 702, and the previously-registered personal information is transmitted from the server 702 to the cash register terminal 703. Thus, the personal information and the usage information can be subjected to a consolidated examination.

Figure 9:
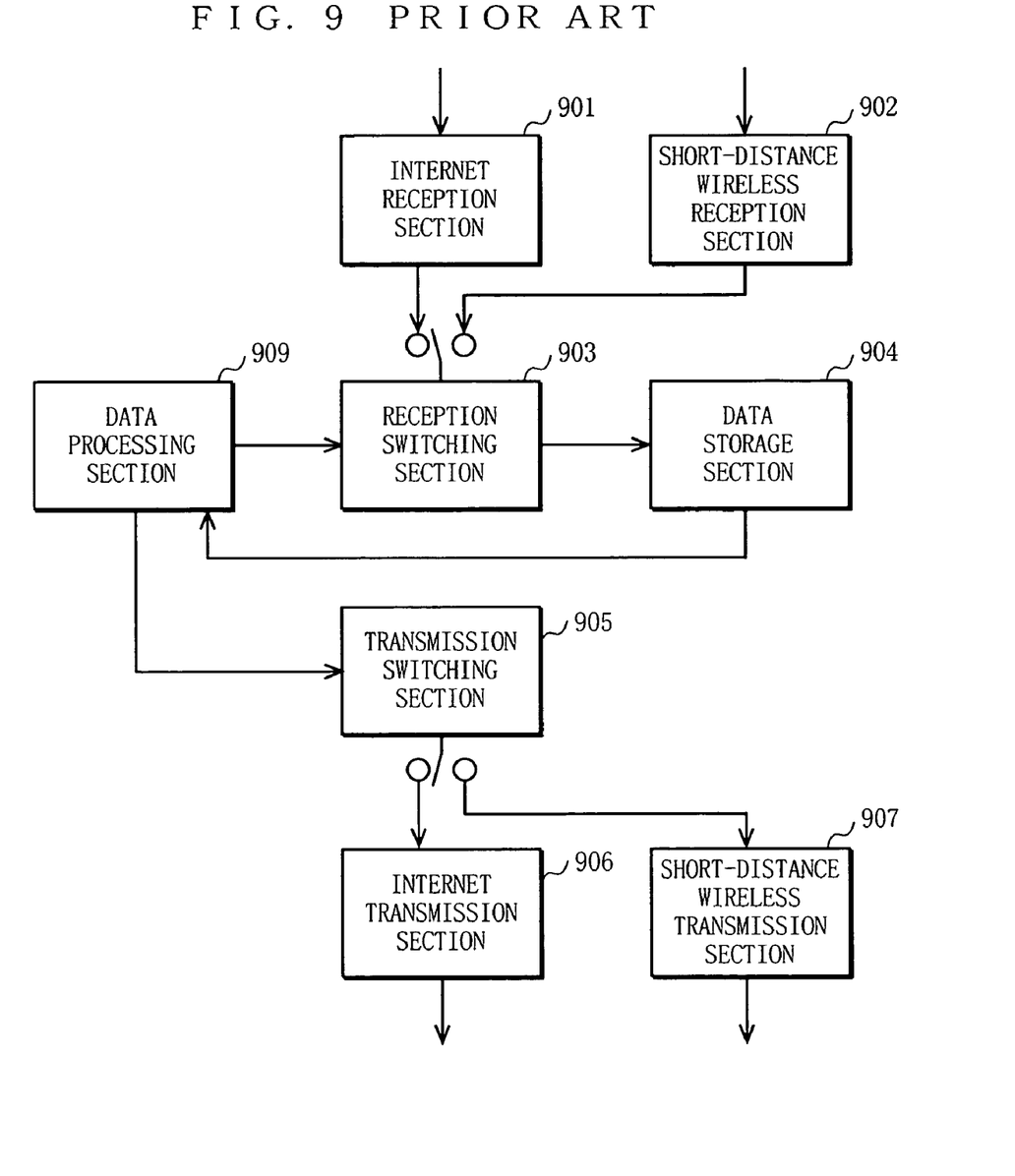
FIG. 9 is a block diagram illustrating the structure of a conventional mobile communication device.

FIG. 9 illustrates an exemplary structure of a conventional mobile terminal 701. The operation of the conventional mobile terminal 701 will now be briefly described. Via wireless Internet access, an Internet reception section 901 receives data from a predetermined URL (which corresponds in this case to the server 702) on the internet. Via infrared communication, a short-distance wireless reception section 902 receives predetermined data from a nearby-located external device (which corresponds in this case to the cash register terminal 703). A data processing section 909 controls the communications in accordance with a predetermined protocol (e.g., the operation sequence shown in FIG. 8). Under the control of the data processing section 909, a reception switching section 903 accepts received data from either the Internet reception section 901 or the short-distance wireless reception section 902. The received data is stored in a data storage section 904. Thereafter, the received data, which may be converted to appropriate data for transmission to the server 702 or the external device, e.g., the cash register terminal 703, is passed to a transmission switching section 905 as transmission data (i.e., data to be transmitted). Under the control of the data processing section 909, the transmission switching section 905 supplies the transmission data to an Internet transmission section 906 or a short-distance wireless transmission section 907. Via wireless Internet access, the Internet transmission section 906 transmits the transmission data that is supplied from the transmission switching section 905 to a predetermined URL on the Internet. Via infrared communication, the short-distance wireless transmission section 907 transmits the transmission data that is supplied from the transmission switching section 905 to a nearby-located external device 703.

Through the above-described operation, the mobile terminal 701 can effectuate data communications with both the server 702 on the Internet and the nearby-located external device 703 in accordance with a predetermined protocol. As a result, various services can be realized through the exchange of predetermined data between the server 702 and the external device 703. Japanese Patent Laid-Open Publication No. 2000-148637 discloses a mobile communication device which can access a nearby-located external device in the above-described manner.

However, the above-described conventional mobile terminal 701 has a problem in that the data processing section 909 can only perform a fixed process or processes, such that the data processing section 909 can only exchange predetermined data with the server 702 and/or the external device 703 in accordance with a predetermined fixed protocol. Therefore, if there is a need to change the communication protocol in the service shown in FIG. 8, e.g., with respect to the sequence with the server 702, the sequence with the cash register terminal 703, the data format of the discount coupons, or the order of data transmission to the cash register terminal 703, the data processing section 909 must itself be re-designed and replaced. This makes it difficult to flexibly support changing services.

Figure 10:
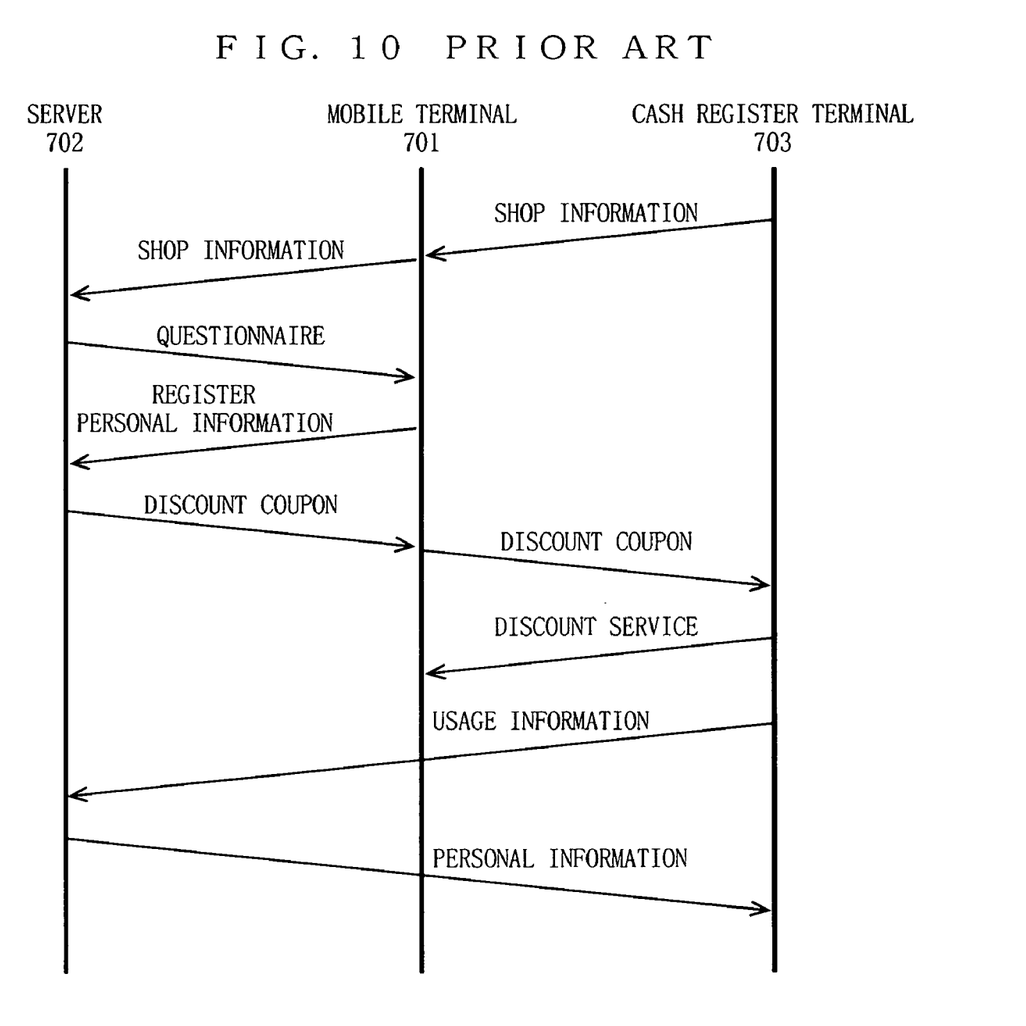
FIG. 10 is a sequence diagram illustrating the operation of another conventional discount service system.

FIG. 10 shows an alternative sequence to the sequence shown in FIG. 8, which is performed by the discount service. In this alternative sequence, the mobile terminal 701 must first obtain shop information from the cash register terminal 703, and transfer the shop information to the server 702. However, a mobile terminal 701 which is designed to process the sequence shown in FIG. 8 cannot utilize this discount service because the data processing section 909 does not support this alternative sequence.

SUMMARY OF THE INVENTION

Therefore, an object of the present invention is to provide a mobile communication device which is capable of flexibly supporting various services which require the use of both Internet communications and short-distance wireless communications.

The present invention has the following features to attain the above-described object.

A first aspect of the present invention is directed to a mobile communication device for being coupled to an external device having a short-distance wireless communication function and a server on a network in a manner so as to enable communications for exchanging data with the external device and the server in accordance with a predetermined protocol. The mobile communication device comprises: short-distance wireless reception means for receiving data from the external device; network reception means for receiving data from the server; short-distance wireless transmission means for transmitting data to the external device; network transmission means for transmitting data to the server; instruction data receiving means for receiving instruction data from an external source prior to performing a set of data exchanges, wherein the instruction data indicates a protocol in which the set of data exchanges are to be performed; analysis means for analyzing the instruction data received by the instruction data receiving means; and switching means for selecting one or more of the short-distance wireless reception means, the network reception means, the short-distance wireless transmission means, and the network transmission means so as to create a data transmission/reception path for allowing the set of data exchanges with the external device and the server to occur in accordance with the predetermined protocol, wherein the predetermined protocol is based on an analysis result of the instruction data by the analysis means.

Thus, according to the first aspect, exchanges of data are made with both an external device having a short-distance wireless communication function and a server on a network in accordance with a protocol which is based on externally-provided instruction data. Therefore, even when a service protocol is changed, for example, it is possible to flexibly support the new service without changing the construction of the mobile communication device itself. As used herein, a "protocol" means a set of parameters governing data communications, e.g., the order of data transmission/reception, transmission/reception destinations for data, and data attributes.

According to a second aspect, in accordance with the first aspect, the instruction data is described in XML (Extensible Markup Language).

Thus, according to the second aspect, data which is described in conventional-used XML may be employed as instruction data, thereby making it easy to introduce a function of interpreting instruction data in the mobile communication device.

According to a third aspect, in accordance with the first aspect, the instruction data comprises an instruction for transferring predetermined data from one of the server or the external device to the other.

Thus, according to the third aspect, the mobile communication device can mediate data between the server and the external device. As a result, even if the server and the external device are not coupled via any communication lines, it is still possible to provide a service utilizing data transfer between the two. For example, data such as discount coupons can be mediated by the mobile communication device between a server and an external device which are not directly coupled to each other.

According to a fourth aspect, in accordance with the first aspect, the instruction data comprises address information for designating a destination that is to be accessed when exchanging data with the server.

Thus, according to the fourth aspect, even if a destination to be accessed when exchanging data with the server is changed due to alterations made to the service, for example, it is possible to flexibly support the new service without changing the construction of the mobile communication device itself.

According to a fifth aspect, in accordance with the first aspect, the instruction data comprises a session ID, and the mobile communication device further comprises session ID addition means for adding the session ID contained in the instruction data that is analyzed by the analysis means to transmission data.

Thus, according to the fifth aspect, a session ID is added to transmission data, and thus it is possible to issue a plurality of instruction data so as to be associated with a single session. Consequently, in the case where a given protocol conditionally diversifies into two or more patterns in the middle of a session, two or more instruction data corresponding to the resulting two or more patterns after diversification may simply be provided. As a result, the size of each instruction data can be reduced, thereby making it possible to optimize the utility of the storage capacity in the mobile communication device. Since the contents to be described in the instruction data can be simplified, it is easy to prepare the descriptions in the instruction data.

A sixth aspect of the present invention is directed to a data communication method for exchanging data with an external device having a short-distance wireless communication function and a server on a network in accordance with a predetermined protocol, by using a mobile communication device which is coupled to and capable of communicating with the external device and the server. The data communication method comprises: an instruction data receiving step of receiving instruction data from an external source prior to performing a set of data exchanges, wherein the instruction data indicates a protocol in which the set of data exchanges are to be performed; an analysis step of analyzing the received instruction data; and a data communication step of performing the set of data exchanges with the external device and the server in accordance with the predetermined protocol, wherein the predetermined protocol is based on an analysis result of the instruction data.

Thus, according to the sixth aspect, exchanges of data are made with both an external device having a short-distance wireless communication function and a server on a network in accordance with a protocol which is based on externally-provided instruction data. Therefore, even when a service protocol is changed, for example, it is possible to flexibly support the new service without changing the construction of the mobile communication device itself.

DESCRIPTION OF THE PREFERRED EMBODIMENTS

Hereinafter, various embodiments of the present invention will be described with reference to the accompanying drawings.

First Embodiment

Figure 1:
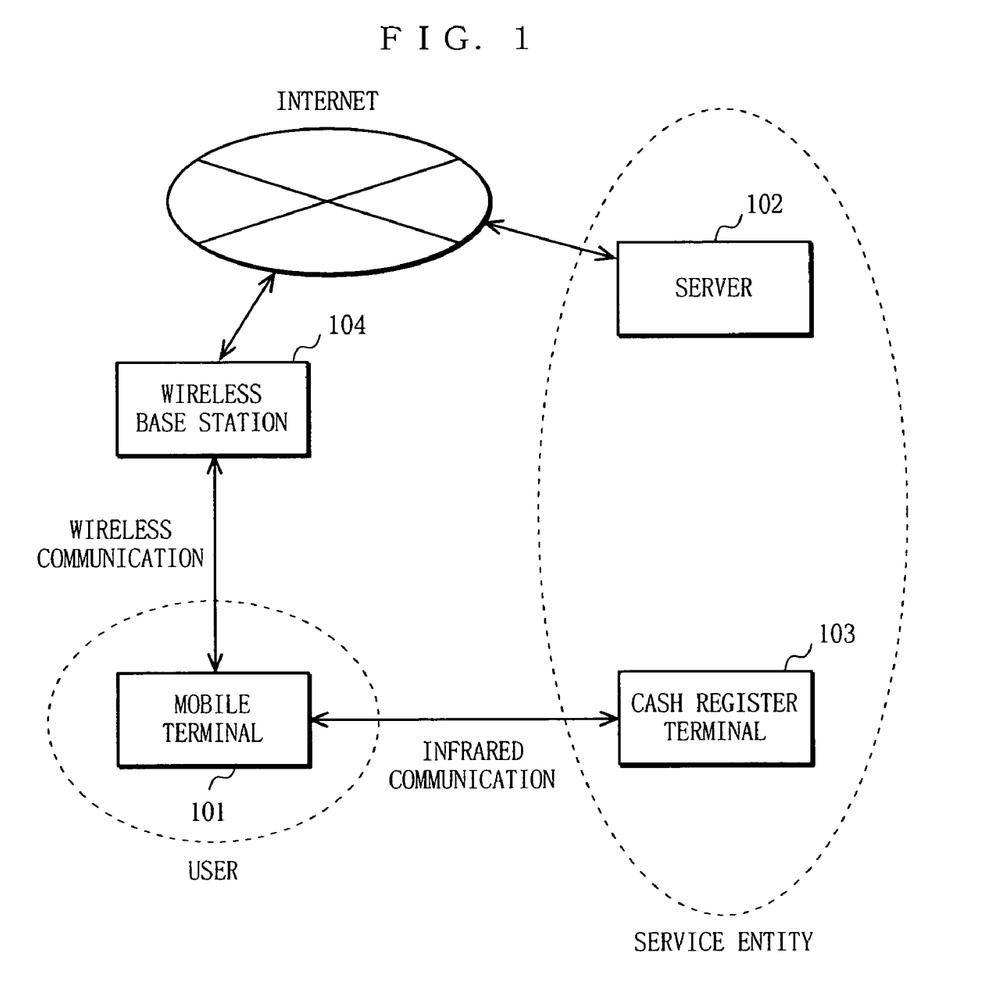
FIG. 1 is a block diagram illustrating the overall configuration of a system employing a mobile communication device according to a first embodiment of the present invention.

FIG. 1 is a block diagram illustrating the overall configuration of a system employing a mobile communication device (shown as a mobile terminal 101) according to a first embodiment of the present invention. The mobile terminal 101 has a wireless Internet communication function and an infrared communication function. The mobile terminal 101 is coupled to a server 102 via a wireless base station 104 and the Internet so as to be capable of communicating with the server 102. The mobile terminal 101 is also coupled to a nearby-located cash register terminal 103 via infrared communication so as to be capable of communicating with the cash register terminal 103. Although the server 102 and the cash register terminal 103 are shown as being managed by a single service-providing entity in FIG. 1, the illustrated system is only exemplary, and the present invention is not limited thereto.

Although the mobile terminal 101 is illustrated as being coupled to the server 102 via the Internet, the present invention is not limited thereto; alternatively, the mobile terminal 101 may be coupled to the server 102 via any other network (e.g., an intranet). Although the mobile terminal 101 and the cash register terminal 103 are illustrated as being coupled via infrared communication, the present invention is not limited thereto; alternatively, the mobile terminal 101 and the cash register terminal 103 may be coupled in a manner so as to enable communication with each other via any other mode of short-distance wireless communication (e.g., Blue Tooth).

Figure 2:
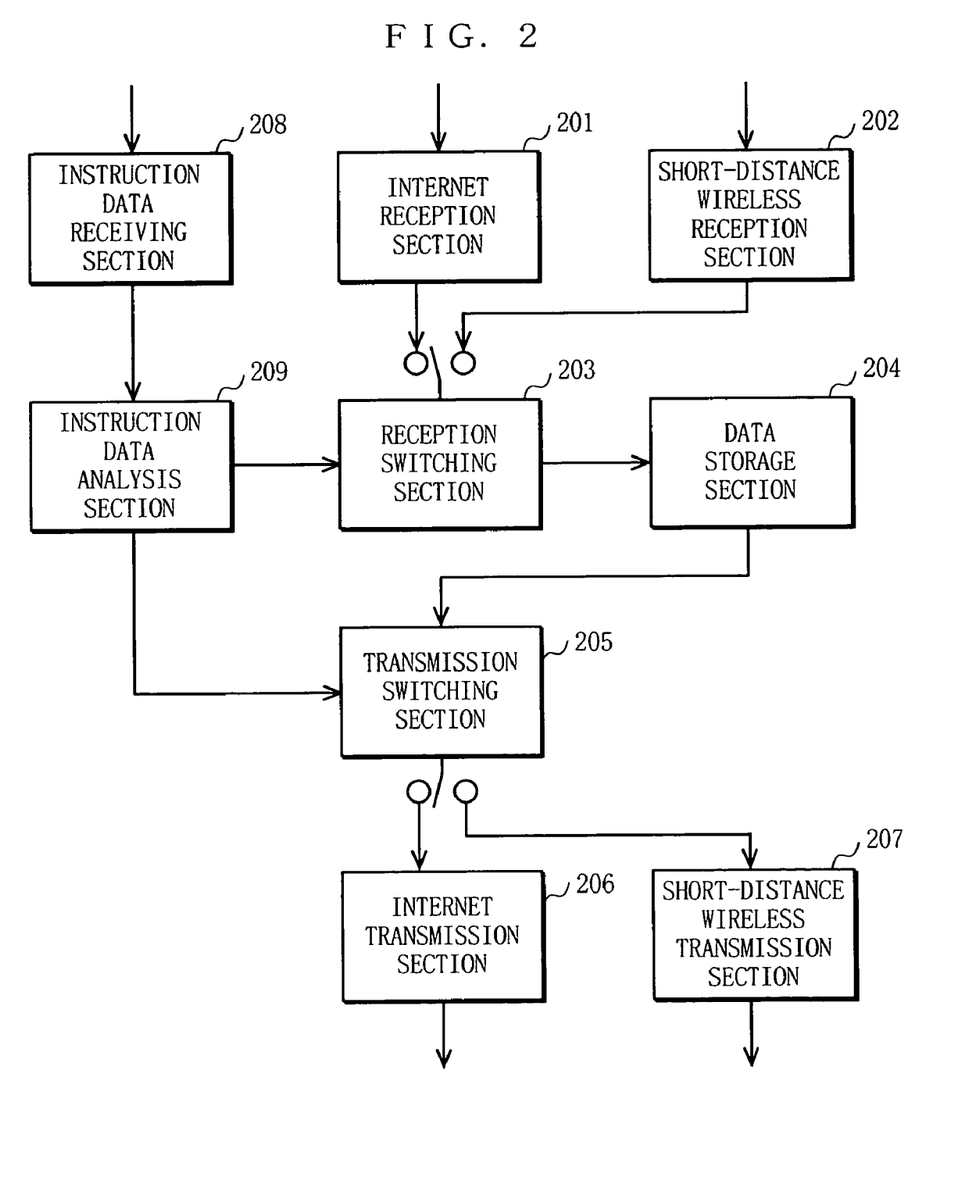
FIG. 2 is a block diagram illustrating the structure of a mobile communication device according to the first embodiment of the present invention.

With reference to FIG. 2, the mobile communication device 101 will be described. As shown in FIG. 2, the mobile communication device 101 includes an Internet reception section 201, a short-distance wireless reception section 202, a reception switching section 203, a data storage section 204, a transmission switching section 205, an Internet transmission section 206, a short-distance wireless transmission section 207, an instruction data receiving section 208, and an instruction data analysis section 209. Hereinafter, the operation of the mobile communication device 101 will be described.

The Internet reception section 201 receives data over the Internet, and passes the received data to the reception switching section 203. The short-distance wireless reception section 202 receives data from the external device (e.g., the cash register terminal) 103 having an infrared communication function, and passes the received data to the reception switching section 203. Under the control of the instruction data analysis section 209, the reception switching section 203 receives data from either the Internet reception section 201 or the short-distance wireless reception section 202, and outputs the received data to the data storage section 204. The data storage section 204 stores the data received from the reception switching section 203, and outputs the stored data to the transmission switching section 205 under the control of the instruction data analysis section 209. Under the control of the instruction data analysis section 209, the transmission switching section 205 outputs data to either the Internet transmission section 206 or the short-distance wireless transmission section 207. The Internet transmission section 206 outputs the data received from the transmission switching section 205 onto the Internet. The short-distance wireless transmission section 207 transmits the data received from the transmission switching section 205 to an external device (e.g., the cash register terminal 103) via short-distance wireless communication. The instruction data receiving section 208 receives instruction data from an external source, and outputs the received instruction data to the instruction data analysis section 209. The instruction data analysis section 209 analyzes the instruction data received by the instruction data receiving section 208, and controls the reception switching section 203 and the transmission switching section 205 based on the analysis result.

As described above, the mobile communication device 101 exchanges data with the server 102 on the Internet, and with the cash register terminal 103 via infrared communication. The transmission/reception protocol of the mobile terminal 101 is controlled based on the instruction data received by the instruction data receiving section 208. The instruction data may be stored in the server 102 on the Internet, and supplied to the mobile terminal 101 over the Internet. Note that the instruction data does not need to be provided over the Internet, but may be provided from an external source in any manner, e.g., via some form of communication.

Figure 3:
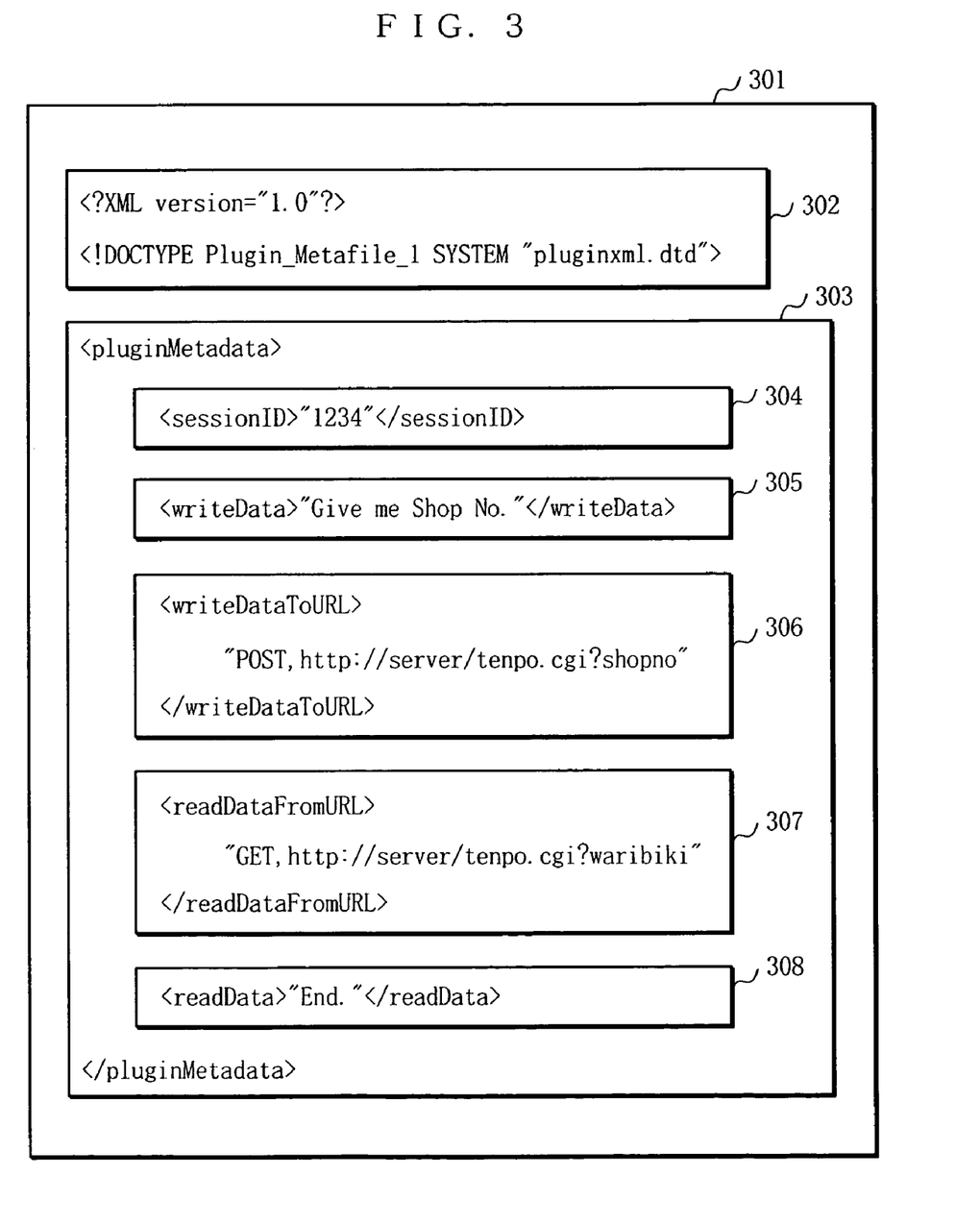
FIG. 3 is a diagram illustrating a specific example of instruction data.

FIG. 3 is a diagram illustrating a specific example of the instruction data. In this specific example, the instruction data is described in XML (Extensible Markup Language). In FIG. 3, the instruction data 301 includes: an XML declaring portion 302 which declares that the instruction data 301 is described in XML and thus designates a method for interpreting the data; and a data describing portion 303, in which data concerning the actual transmission/reception sequence is described. The instruction data 301 does not need to be described in XML, but may be described in any other language.

The data describing portion 303 will now be described in detail. As shown in FIG. 3, the data describing portion 303 includes a session ID describing portion 304, an infrared data transmission describing portion 305, an Internet transmission describing portion 306, an Internet reception describing portion 307, and an infrared data reception describing portion 308. The session ID describing portion 304 designates a session ID. The infrared data transmission describing portion 305 includes a <writeData> tag, which describes that data is to be transmitted via infrared communication, together with a description of the data for transmission via infrared communication. The Internet transmission describing portion 306 describes that data is to be received via infrared communication, and that the received data is to be transmitted to a server which is indicated within a <writeDataToURL> tag. The Internet reception describing portion 307 describes that data is to be received via the Internet from a server which is indicated within a <readDataFromURL> tag, and that the received data is to be transmitted to an external device which is coupled via infrared communication. The infrared data reception describing portion 308 includes a <readData> tag, which describes that data is to be received via infrared communication, together with a description of the content of the data. Note that these tags are sequentially processed from top to bottom. By changing the types, order, combination, and contents of these tags as necessary, it is possible to describe a protocol which is required to realize a desired service in the form of instruction data.

Figure 4:
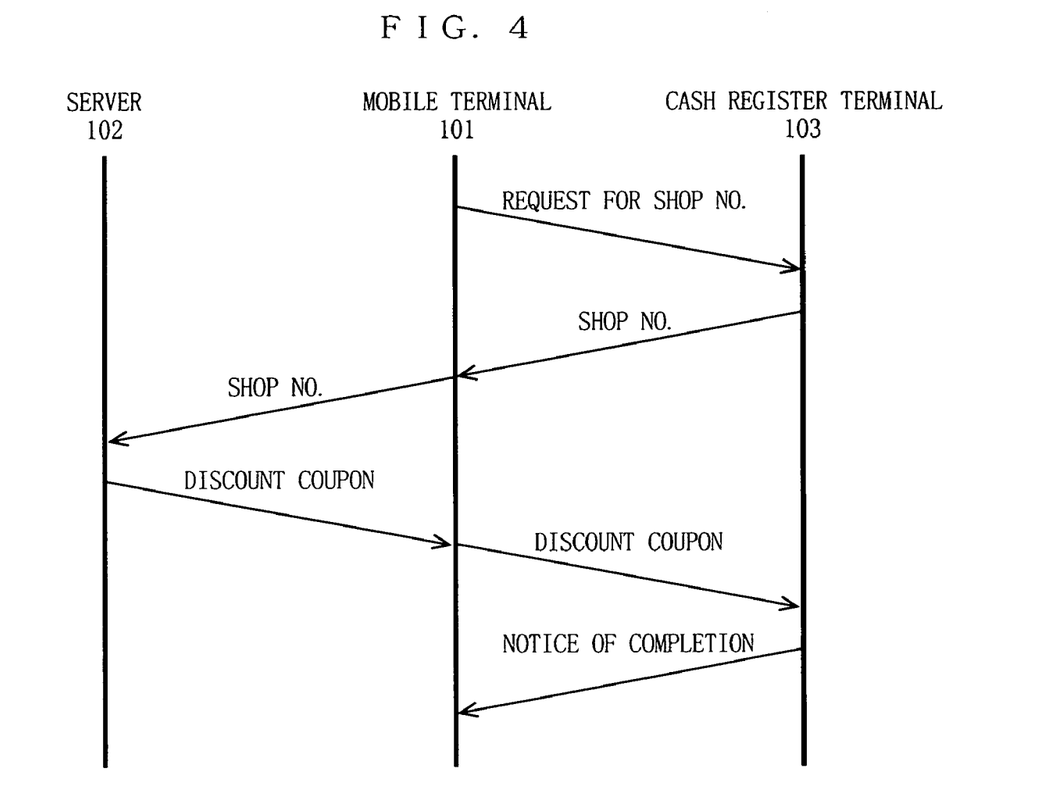
FIG. 4 is a sequence diagram illustrating an exemplary operation of the overall system shown in FIG. 1.

Next, the operation of the mobile terminal 101, based on the instruction data 301 shown in FIG. 3, will be specifically described. FIG. 4 illustrates a sequence of operations of the mobile terminal 101, the server 102, and the cash register terminal 103. Prior to performing the protocol shown in FIG. 4, the mobile terminal 101 receives the instruction data 301 from the server 102 over the Internet. The data exchange shown in FIG. 4 occurs based on the received instruction data 301. Based on the infrared data transmission describing portion 305, the mobile terminal 101 transmits a shop number requesting command such as "Give me Shop No." to the cash register terminal 103 via infrared communication. At this point, under the control of the instruction data analysis section 209, the transmission switching section 205 passes the shop number requesting command to the short-distance wireless transmission section 207. Next, based on the Internet transmission describing portion 306, the mobile terminal 101 receives a shop number from the cash register terminal 103 via infrared communication, and transmits the received shop number to a URL (i.e., the server 102) which is designated by the Internet describing portion 306 over the Internet. At this point, under the control of the instruction data analysis section 209, the reception switching section 203 receives the shop number from the short-distance wireless reception section 202, and transmits the received shop number to the data storage section 204. Upon receiving the shop number from the data storage section 204, the transmission switching section 205 passes the shop number to the Internet transmission section 206. Next, based on the Internet reception describing portion 307, the mobile terminal 101 receives a discount coupon from the designated URL over the Internet, and transmits the received discount coupon to the cash register terminal 103 via infrared communication. At this point, under the control of the instruction data analysis section 209, the reception switching section 203 receives the discount coupon from the Internet reception section 201, and the transmission switching section 205 passes the discount coupon to the short-distance wireless transmission section 207. Next, based on the infrared data reception describing portion 308, the mobile terminal 101 receives a notice of completion, i.e., "End", from the cash register terminal 103 via infrared communication. At this point, under the control of the instruction data analysis section 209, the reception switching section 203 receives the notice of completion from the short-distance wireless reception section 202. Any data transmission/reception over the Internet described above may be performed via HTTP communications.

In the example protocol shown in FIG. 4, the server 102 may designate a discount value based on the shop number which is received from the cash register terminal 103 via the mobile terminal 101, whereby it becomes possible to provide a discount service in which different shops are associated with different discount values. In one variant thereof, the server 102 may issue different instruction data to the mobile terminal 101 depending on the shop number, whereby it becomes possible to provide different versions of services for different shops. For example, discount coupons may be unconditionally issued for some shops, while other shops may require the user to have filled out a questionnaire before the user can be entitled to discount coupons. It will be appreciated that the above-described protocol and its variant can be realized through the use of any information, instead of a shop number, that identifies an external device to be coupled via short-distance wireless communication. Thus, a service which is adapted to the whereabouts of a user can be easily provided.

Figure 5:
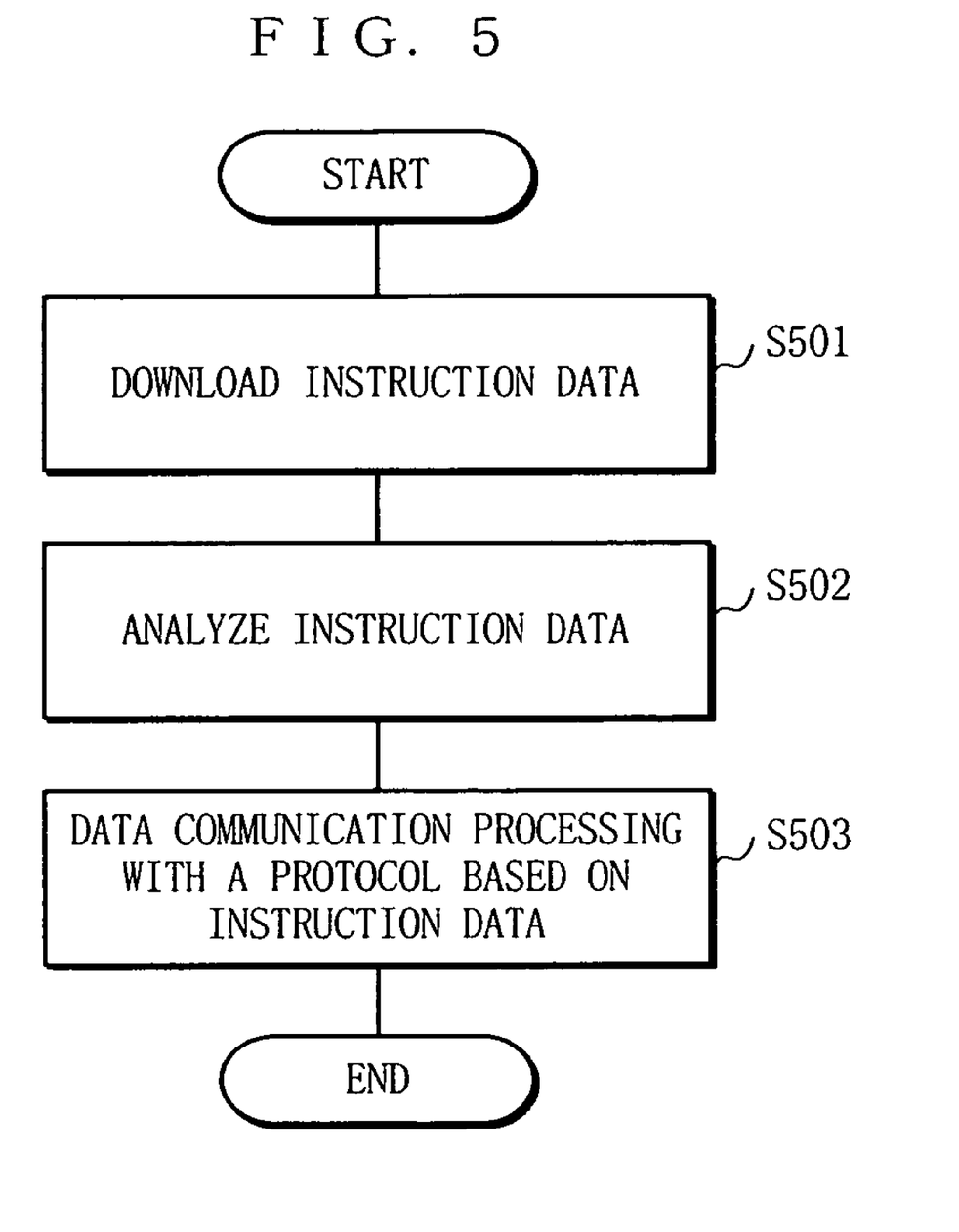
FIG. 5 is a flowchart illustrating the operation of a mobile communication device.

FIG. 5 is a flowchart illustrating the overall operation of the mobile terminal 101. In order to qualify for a service, the mobile terminal 101 first receives instruction data from the server 102 (step S501). Next, the mobile terminal 101 analyzes the received instruction data (step S502). Then, with a protocol based on the analysis result, data communication processing (e.g., a sequence of processes as shown in FIG. 4) is performed (step S503).

As described above, according to the first embodiment of the present invention, data exchanges can be performed with both an external device having a short-distance wireless communication function and a server on a network in accordance with a protocol which is based on externally-provided instruction data. Accordingly, even when a service protocol is changed, it is possible to flexibly support the new service without changing the construction of the mobile communication device itself.

Second Embodiment

Figure 6:
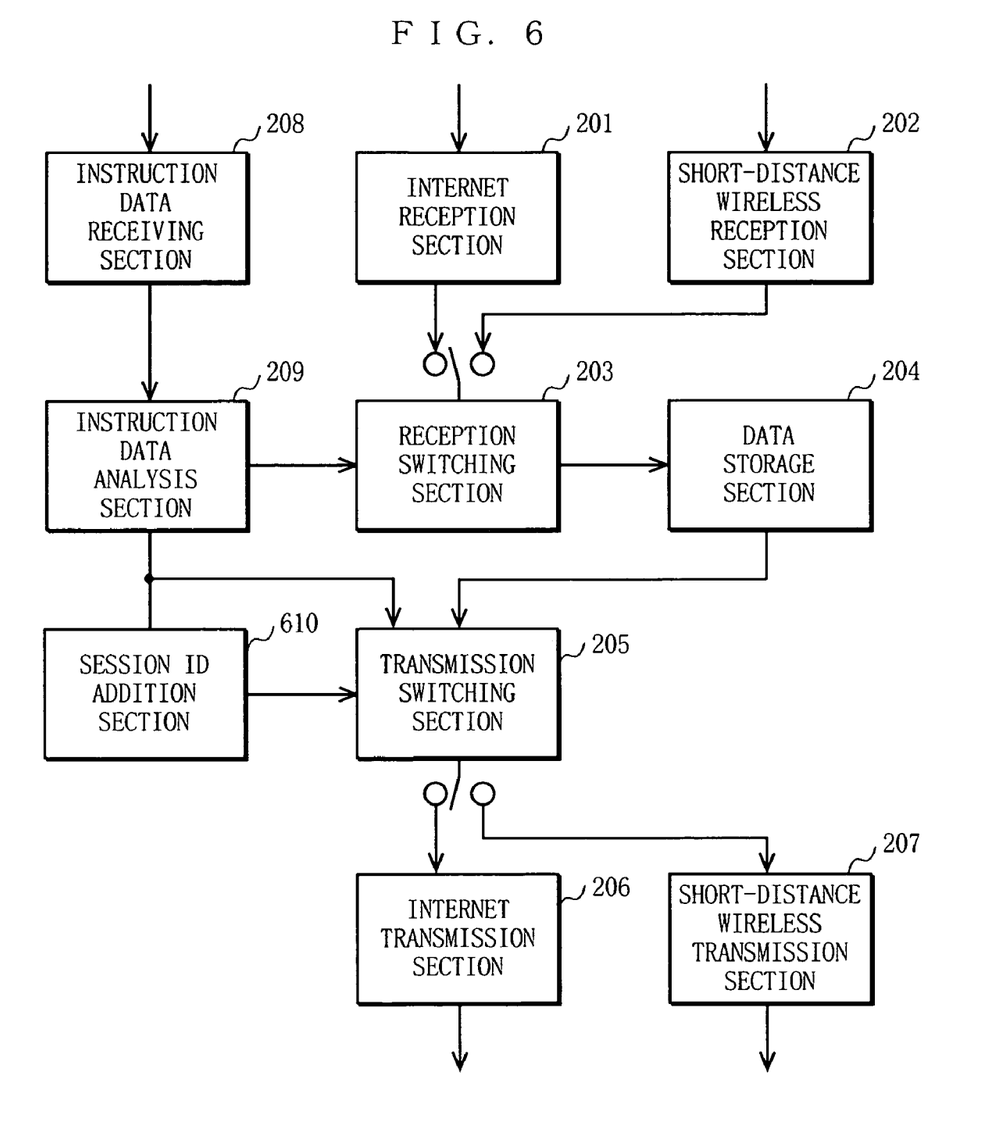
FIG. 6 is a block diagram illustrating the structure of a mobile communication device according to a second embodiment of the present invention.

FIG. 6 is a block diagram illustrating the structure of a mobile communication device according to a second embodiment of the present invention. In FIG. 6, any component elements which also appear in FIG. 2 are denoted by the same reference numerals as those used therein, and the descriptions thereof are omitted. The structure shown in FIG. 6 differs from that shown in FIG. 2 in that a session ID addition section 610 is additionally included. The overall system configuration employing the mobile communication device shown in FIG. 6 may be the same as that shown in FIG. 1. Hereinafter, the operation according to the second embodiment will be described with a focus on the processes which involve the session ID addition section 610.

The instruction data receiving section 208 receives instruction data from the server 102 over the Internet. Based on the session ID describing portion 304 of the received instruction data 301, the instruction data analysis section 209 reads a session ID, and passes the read session ID to the session ID addition section 610. The session ID addition section 610 adds the session ID passed from the instruction data analysis section 209 to transmission data which is to be transmitted via the transmission switching section 205.

Thus, the second embodiment not only attains the same effects as those under the first embodiment, but also makes it possible, by the addition of a session ID to transmission data, to issue a plurality of instruction data so as to be associated with a single session. Consequently, even in the case where a given protocol conditionally diversifies into two or more patterns in the middle of a session, two or more instruction data corresponding to the resulting two or more patterns after diversification may simply be provided. As a result, the size of each instruction data can be reduced, thereby making it possible to optimize the utility of the storage capacity in the mobile communication device. Since the contents to be described in the instruction data can be simplified, it is easy to prepare the descriptions in the instruction data.

While the present invention has been described in detail, the foregoing description is in all aspects illustrative and not restrictive. It is to be understood that numerous other modifications and variations can be devised without departing from the scope of the present invention.

What is claimed is:

1. A mobile communication device operable to be coupled to an external device having a short-distance wireless communication function and a server on a network in a manner so as to enable communications for exchanging data with the external device and the server in accordance with a predetermined protocol, said mobile communication device comprising:

short-distance wireless reception means for receiving data from the external device;
network reception means for receiving data from the server;
short-distance wireless transmission means for transmitting data to the external device;
network transmission means for transmitting data to the server;
instruction data receiving means for receiving instruction data from an external source prior to performing a set of data exchanges, wherein the instruction data indicates a protocol in which the set of data exchanges are to be performed;
analysis means for analyzing the instruction data received by said instruction data receiving means; and
switching means for selecting one or more of said short-distance wireless reception means, said network reception means, said short-distance wireless transmission means, and said network transmission means so as to create a data transmission/reception path for allowing the set of data exchanges with the external device and the server to occur in accordance with the predetermined protocol, wherein the predetermined protocol is based on an analysis result of the instruction data by said analysis means;
wherein the instruction data contains:
a description for instructing said short-distance wireless reception means to receive identification information which is specific to the external device from the external device;
a description for instructing said network transmission means to transmit to the server the identification information received by said short-distance wireless reception means;
a description for instructing said network reception means to receive, from the server, one of a plurality of units of information stored in the server, the unit of information corresponding to the identification information transmitted by said network transmission means; and
a description for instructing said short-distance wireless transmission means to transmit to the external device the unit of information received by said network reception means.

2. The mobile communication device according to claim 1, wherein the instruction data is described in XML.

3. The mobile communication device according to claim 1, wherein the instruction data comprises an instruction for transferring predetermined data from one of the server or the external device to each other.

4. The mobile communication device according to claim 1, wherein the instruction data comprises address information for designating a destination to be accessed when exchanging data with the server.

5. The mobile communication device according to claim 1, wherein the instruction data comprises a session ID, and wherein said mobile communication device further comprises session ID addition means for adding, to transmission data, the session ID contained in the instruction data analyzed by said analysis means.

6. A data communication method for exchanging data with an external device having a short-distance wireless communication function and a server on a network in accordance with a predetermined protocol by using a mobile communication device coupled to and operable to communicate with the external device and the server, said method comprising:

receiving instruction data from an external source prior to performing a set of data exchanges, wherein the instruction data indicates a protocol in which the set of data exchanges are to be performed;
analyzing the instruction data received in said receiving of the instruction data; and
performing the set of data exchanges with the external device and the server in accordance with the predetermined protocol, wherein the predetermined protocol is based on an analysis result of the instruction data analyzed in said analyzing of the instruction data;
wherein said performing of the set of data exchanges comprises:
receiving identification information which is specific to the external device from the external device;
transmitting the identification information received in said receiving of the identification information to the server;
receiving from the server a unit of information corresponding to the identification information transmitted in said transmitting of the identification information; and
transmitting to the external device the unit of information received in said receiving of the unit of information.

7. The data communication method according to claim 6, wherein the instruction data is described in XML.

8. The data communication method according to claim 6, wherein the instruction data comprises an instruction for transferring predetermined data from one of the server or the external device to each other.

9. The data communication method according to claim 6, wherein the instruction data comprises address information for designating a destination to be accessed when exchanging data with the server.

10. The data communication method according to claim 6, wherein the instruction data comprises a session ID, and wherein said method further comprises adding, to transmission data, the session ID contained in the instruction data analyzed in said analyzing of the instruction data.

11. A mobile communication device operable to be coupled to an external device having a short-distance wireless communication function and a server on a network in a manner so as to enable communications for exchanging data with the external device and the server in accordance with a predetermined protocol, said mobile communication device comprising:

a short-distance wireless reception unit operable to receive data from the external device;

a network reception unit operable to receive data from the server;

a short-distance wireless transmission unit operable to transmit data to the external device;

a network transmission unit operable to transmit data to the server;

an instruction data receiving unit operable to receive instruction data from an external source prior to performing a set of data exchanges, wherein the instruction data indicates a protocol in which the set of data exchanges are to be performed;

an analysis unit operable to analyze the instruction data received by said instruction data receiving unit; and a switching unit operable to select one or more of said short-distance wireless reception unit, said network reception unit, said short-distance wireless transmission unit, and said network transmission unit so as to create a data transmission/reception path for allowing the set of data exchanges with the external device and the server to occur in accordance with the predetermined protocol, wherein the predetermined protocol is based on an analysis result of the instruction data by said analysis unit;

wherein the instruction data contains:

a description for instructing said short-distance wireless reception unit to receive identification information which is specific to the external device from the external device;

a description for instructing said network transmission unit to transmit to the server the identification information received by said short-distance wireless reception unit;

a description for instructing said network reception unit to receive, from the server, one of a plurality of units of information stored in the server, the unit of information corresponding to the identification information transmitted by said network transmission unit; and a description for instructing said short-distance wireless transmission unit to transmit to the external device the unit of information received by said network reception unit.

12. The mobile communication device according to claim 11, wherein the instruction data is described in XML.

13. The mobile communication device according to claim 11, wherein the instruction data comprises an instruction for transferring predetermined data from one of the server or the external device to each other.

14. The mobile communication device according to claim 11, wherein the instruction data comprises address information for designating a destination to be accessed when exchanging data with the server.

15. The mobile communication device according to claim 11, wherein the instruction data comprises a session ID, and wherein said mobile communication device further comprises a session ID addition unit operable to add, to transmission data, the session ID contained in the instruction data analyzed by said analysis unit.

* * * * *